United States Patent [19]
Dolgas et al.

[11] Patent Number: 5,947,404
[45] Date of Patent: Sep. 7, 1999

[54] STATOR WINDING METHOD AND APPARATUS

[75] Inventors: Patrick A. Dolgas, Milford; Larry E. Staton, Springfield, both of Ohio

[73] Assignee: Globe Products Inc., Huber Heights, Ohio

[21] Appl. No.: 08/853,167

[22] Filed: May 8, 1997

Related U.S. Application Data

[60] Provisional application No. 60/016,588, May 8, 1996.

[51] Int. Cl.[6] ....................................................... H02K 3/46
[52] U.S. Cl. ....................... 242/433.3; 29/596; 242/433.4
[58] Field of Search ............................. 242/433.3, 433.4, 242/432.6; 29/596, 598, 735

[56] References Cited

U.S. PATENT DOCUMENTS

| | | |
|---|---|---|
| 3,713,598 | 1/1973 | Bucholtz et al. . |
| 4,027,827 | 6/1977 | Biddison . |
| 4,052,783 | 10/1977 | Shively . |
| 4,074,418 | 2/1978 | Pearsall . |
| 4,289,281 | 9/1981 | George et al. . |
| 4,340,186 | 7/1982 | Shimada et al. ..................... 242/433.3 |
| 4,459,742 | 7/1984 | Banner . |
| 4,616,788 | 10/1986 | Finegold . |
| 4,997,138 | 3/1991 | Luciani et al. . |
| 5,233,751 | 8/1993 | Luciani et al. . |
| 5,361,487 | 11/1994 | Luciani et al. . |
| 5,394,046 | 2/1995 | Dolgas . |
| 5,535,503 | 7/1996 | Newman ............................... 242/432.6 |
| 5,586,383 | 12/1996 | Dolgas et al. . |
| 5,755,021 | 5/1998 | Beakes et al. ........................ 242/432.6 |

*Primary Examiner*—Katherine A. Matecki
*Attorney, Agent, or Firm*—Roger S. Dybvig

[57] ABSTRACT

A stator winding apparatus is disclosed for use in the manufacture of stators having radially-extending, outwardly-open, coil-receiving slots. Lead wire guide assemblies are provided for guiding lead wires into cavities in individual terminal members mounted on the stator core. In addition, a wire-retaining member is provided to confine a lead wire between the end face of the stator core and the wire retaining member to thereby prevent the lead wire from being inadvertently looped around a portion of the wire-guide tooling provided to guide wire into the stator core slots. Related methods are also disclosed.

19 Claims, 8 Drawing Sheets

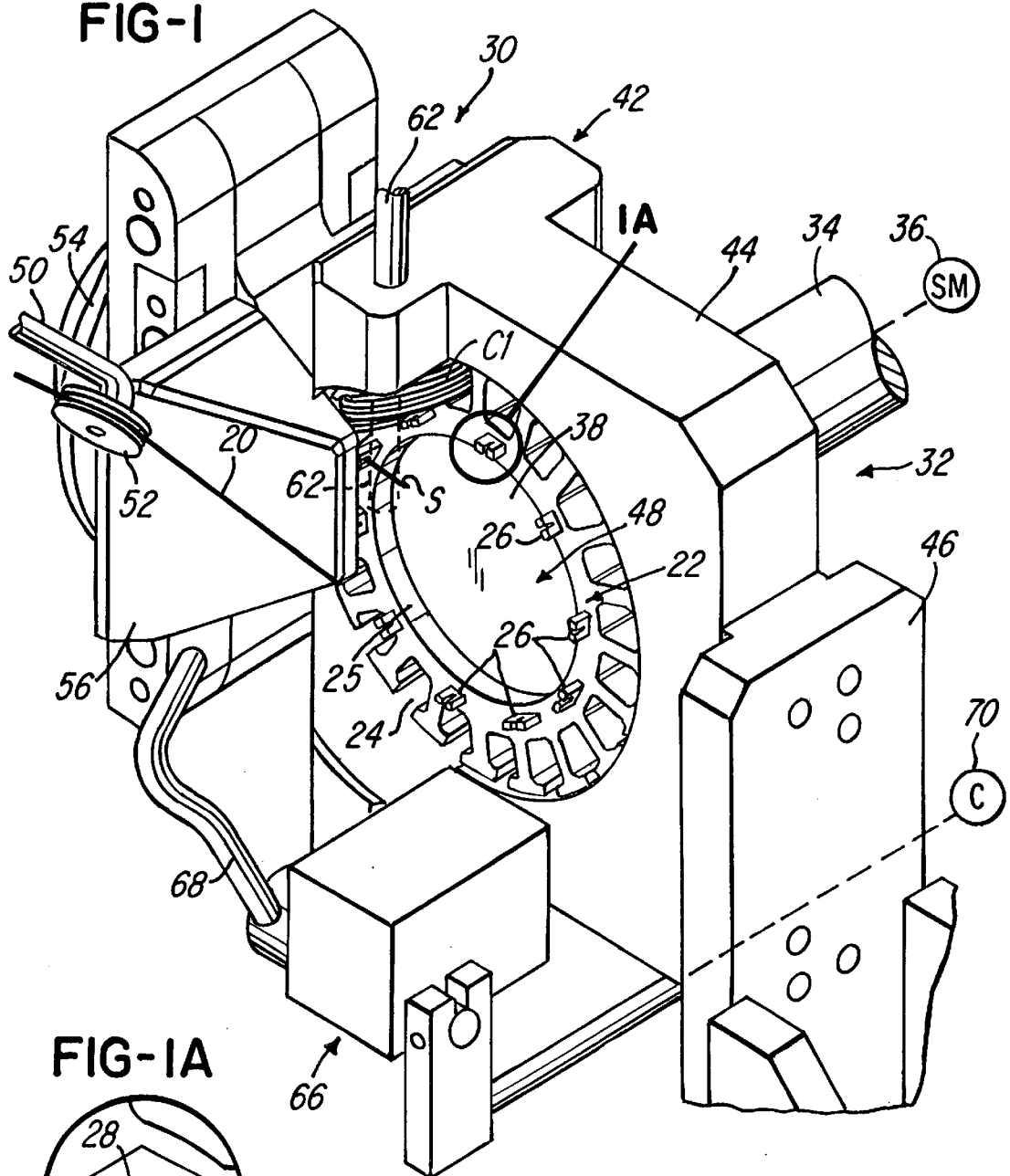
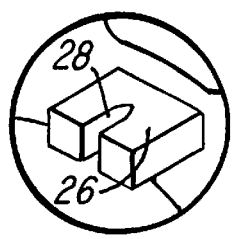

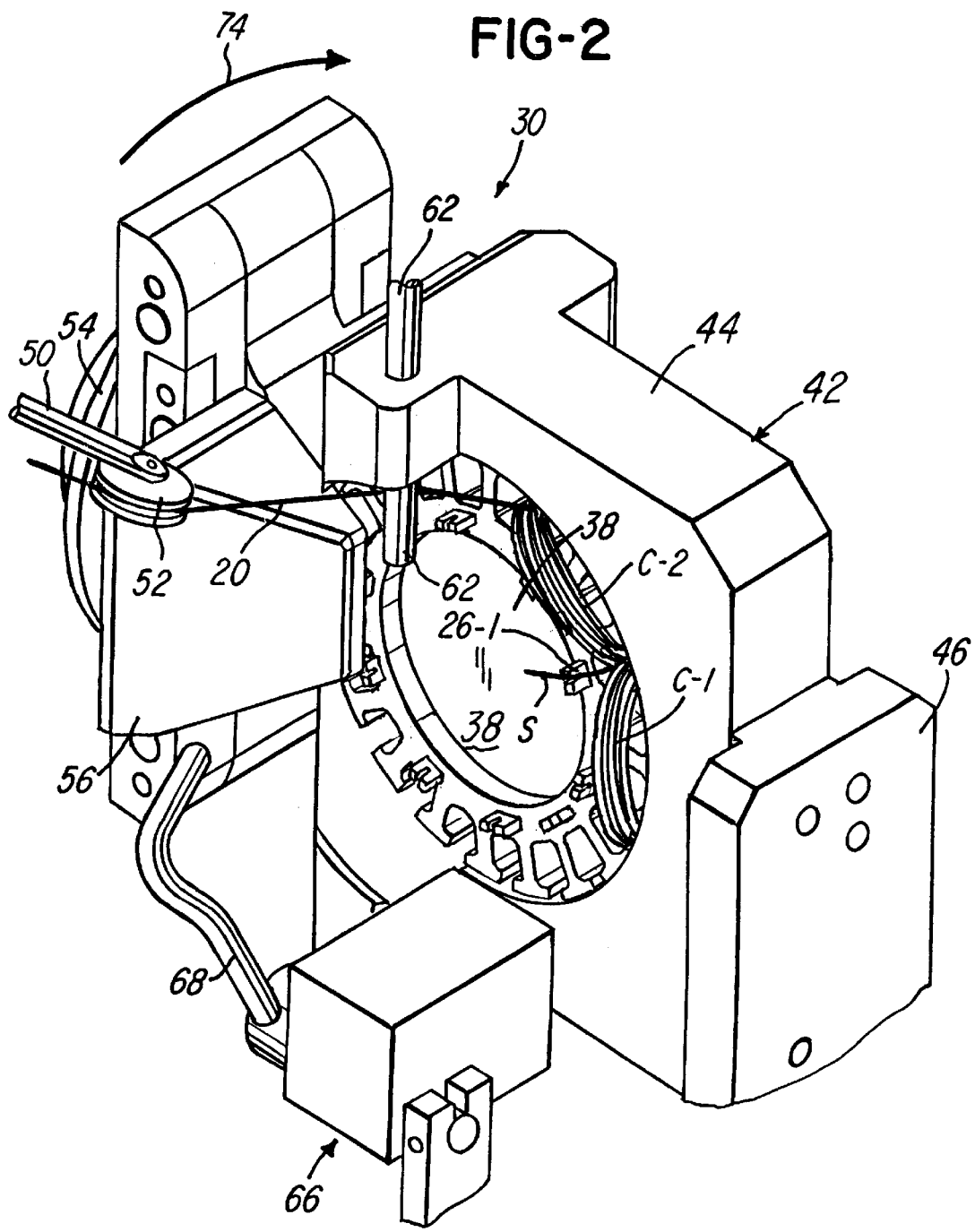

STATOR WINDING METHOD AND APPARATUS

CROSS-REFERENCE TO RELATED APPLICATIONS

This is a provisional patent application Ser. No. 60/016,588, filed May 8, 1996.

FIELD OF THE INVENTION

This invention relates to a method and apparatus for winding electric motor stators and, in particular, to a method and apparatus for winding stators for multiple phase, multiple pole brushless DC electric motors, which stators have plural radially-extending and outwardly opening coil-receiving core slots separated by teeth so shaped that the radially-outermost ends of the coil-receiving slots are open. However, aspects of this invention may also be useful for winding other wound electric motor components.

BACKGROUND OF THE INVENTION

A known method of winding a stator for a brushless DC motor is to support the stator at a winding station by means of a stator rotator assembly driven by a servomotor. Coils of wire are wound on the stator at the winding station by means of a rotating flier, which is similar to fliers used to wind armatures for universal electric motors, in cooperation with a wire-guiding assembly that guides the wire wound by rotation of the flier into a pair of coil-receiving slots in the stator core. As the winding of a stator progresses, the stator core is rotated about its axis by means of the stator rotator assembly to present different pairs of coil-receiving slots in position to receive coils wound by rotation of the flier. During the winding of stators for brushless DC motors, the need may arise to connect a stator coil lead wire segment, termed a "coil finish wire" herein, extending from the end of a freshly wound coil to a terminal member mounted on the stator core and to extend another lead wire segment, termed a "coil start wire" herein, from a terminal member to the beginning of the next coil to be wound. The wire strand used to form the stator coils may be severed when each coil finish wire is connected to a terminal member and before the succeeding start wire is connected to another terminal. However, it is also known not to sever the finish wires at the terminal members during the winding process; rather the wire used to wind the stator and make the lead wire connections extends uncut from a coil start wire terminal member for the first coil wound to a coil finish wire terminal member for the last coil wound. In such event, at a later stage of manufacture, the wire connections between terminals are cut away.

The terminology "terminal members" as used herein may comprise terminals made from conductive material which have wire-receiving cavities formed by slots or other surface configurations, in which case the coil lead wires can be permanently connected to the terminal members, as by hot staking operation, at a later stage of manufacture of a completed stator. Alternatively, the terminal members may be made from a non-conductive material, particularly plastic, and configured to hold the various start wires and finish wires in wire-receiving cavities therein. In a later stage of manufacture, conductive terminals may be connected to the terminal members and the lead wires. Another available alternative is to remove the coil lead wires from the terminal members and connect them to a separate terminal device, such as a printed circuit board, at a later stage in the manufacture of the stator. Thus, for purposes of the present invention, the term "terminal member" encompasses all structures, whether made from conductive or non-conductive material, mounted on a stator core for either temporary or permanent connection of lead wires thereto.

SUMMARY OF THE INVENTION

An object of this invention is to provide an improved method and apparatus for winding stators having radially-outwardly opening core slots by the use of a flier-type winding machine.

More specifically, an object of this invention is to provide an improved method and apparatus for winding stators having radially-outwardly opening core slots and for connecting coil lead wires to stator core-mounted terminal members during the winding process.

Still another object is to simplify the insertion of coil lead wires into terminal members during the winding process.

This invention is intended for use in connection with a flier-type winding machine having wire-guide tooling for directing a wire leading from the flier into a pair of coil-receiving slots of a stator core and also having a stator rotator assembly which holds the stator core at the winding station and rotates the stator core as needed to position the stator core to receive coils wound by the flier and to enable insertion of the coil lead wires into the wire-receiving cavities of the terminal members on the stator core.

In order to achieve the foregoing objects in accordance with this invention, the winding machine includes a lead wire-guiding member located in an operative position adjacent a terminal member in which position a lead wire slides along the wire-guiding member and is thereby guided into the wire-receiving cavity of a terminal member simply by rotation of the flier. The wire-guiding member usually must be movable to an inoperative, out-of-the-way position in which it cannot be engaged by the wire leading from the flier during various rotary or indexing movements of the stator core between the winding of coils thereon. In some cases, the lead wire-guiding member can be moved linearly into and out of its operative position in which a wire-engaging surface thereof is generally aligned with the opening to a terminal member. In other cases, the lead wire-guiding member may be pivoted into and out of its operative position.

As for the method of this invention, there are cases in which a stator core may be rotated in one direction to locate a terminal member that is to receive a lead wire to a position past the position in which it should be located to enable insertion of the lead wire by rotation of the flier. A lead wire-guiding member is then moved into its operative position after which the wire segment leading from the coil just wound to the flier is brought into engagement with the wire-guiding member by a reverse rotation of the stator core. The reverse rotation of the stator core is through an angle sufficient to locate the stator core in a position in which the terminal member that is to receive the wire segment is generally aligned with wire-guiding member so that, upon subsequent flier rotation, the wire segment is guided into the wire-receiving cavity of the terminal member.

There are other cases in which a wire-guiding member can be moved into an operative position such that a wire segment can be guided into a terminal member by rotation of the flier without further rotary motion of the stator core.

Although the wire-guiding members of this invention are intended primarily to guide coil lead wires into terminal members, there are occasions in which a wire-guiding member may be used to confine wire segments during the indexing motions of the stator to ensure that the wire segments are properly located with respect to the tooling used to guide the wire into the stator core slots when the next coil is wound.

Other objects and advantages of this invention will become apparent in view of the following description taken in conjunction with the accompanying drawings.

BRIEF DESCRIPTION OF THE DRAWINGS

FIGS. 1 through 8 are fragmentary perspective views of a stator and stator manufacturing apparatus in accordance with this invention and show, in sequence, representative steps taken to wind coils and connect coil lead wires to terminal members on a stator core in accordance with this invention.

DETAILED DESCRIPTION

Figure 3:
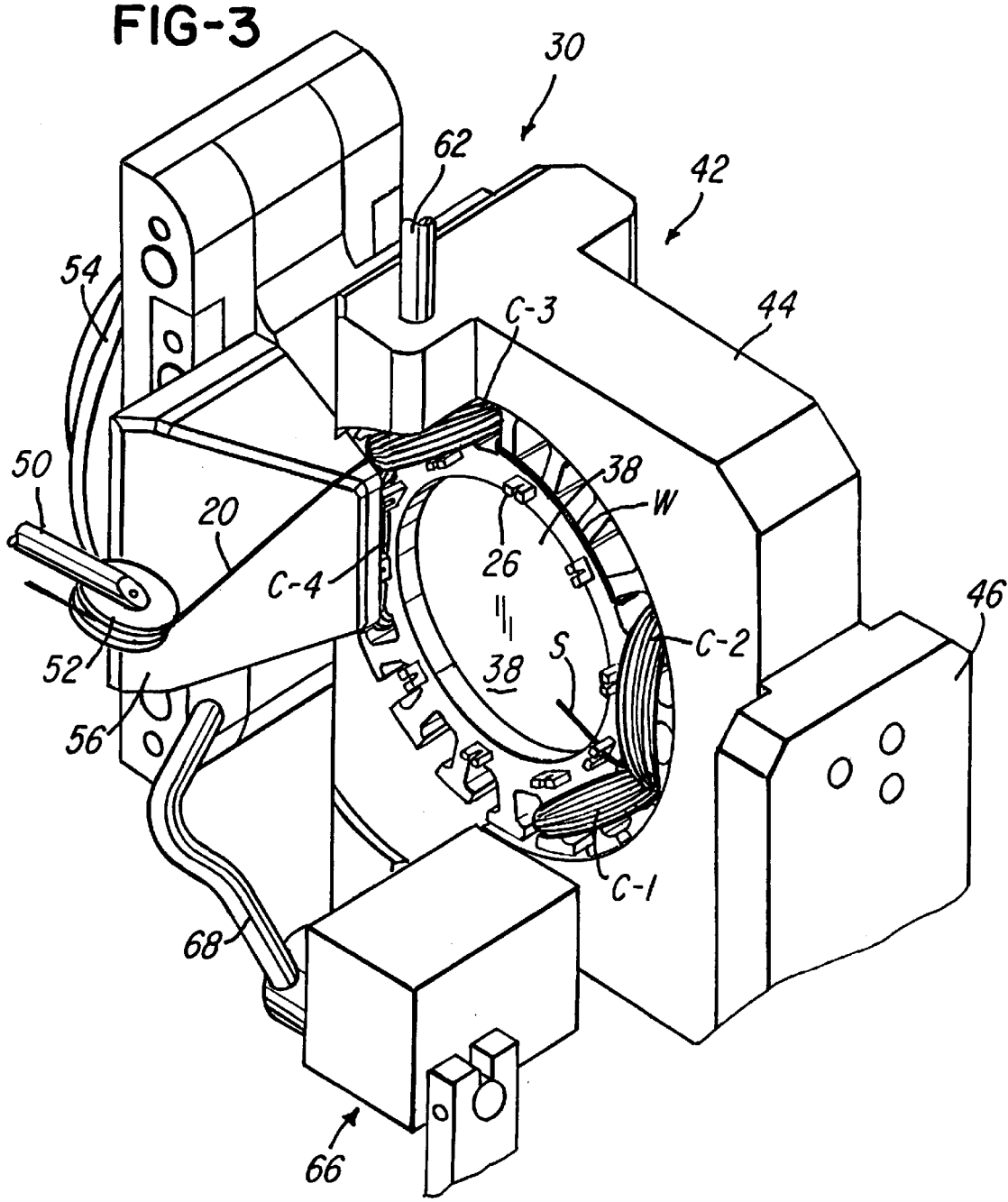

With reference to FIG. 1, this invention provides a method for winding coils of wire 20 on a stator core 22 for forming a brushless DC motor stator. The stator core 22 has a laminated body formed with a plurality of radially-opening core slots 24 and a central bore 25. Plural terminal members 26 project from one end face of the stator core 22. As well known, the terminal members 26 could be mounted on a terminal board (not shown) mounted on the core 22 or could be individually mounted on the core 22, the particular mounting for the terminal members 26 being unimportant for purposes of this invention.

FIG. 1 includes an enlarged view of one of the terminal members 26, wherein it will be noted that it includes a wire-receiving cavity in the form of a slot 28.

This invention is illustrated in connection with a single flier stator winding machine, generally designated 30. The winding machine 30 includes a stator rotator assembly, generally designated 32, that includes a rotator spindle 34 driven by a servomotor 36. The forward end of the spindle 34 is provided with an expandable mandrel 38 that grips the inside of the stator bore 25. As conventional, keys or other devices (not shown) cooperate between the stator bore 25 and the mandrel 38 to obtain a predetermined arcuate relationship between the stator rotator spindle 34 and the stator core 22 gripped by the mandrel 38. Of course, it will be recognized that a variety of mechanisms different from the expandable mandrel 38, such as bayonet connectors or collets used with dummy shafts would be considered equivalent to the expandable mandrel 38 for the purposes of this invention, and can be used for mounting the stator core 22 on the rotator spindle 34 in the practice of the present invention.

The winding machine 30 further comprises a fixed, outer winding form assembly 42 comprising a C-shaped metal block 44 mounted on a stanchion 46 fixed to the bed (not shown) of the machine 30. The metal block 44 has a circular opening 48 for receiving the stator core 22 at the winding station in position to have coils of wires wound in pairs of its coil-receiving slots 24 upon rotation of a rotatable flier 50 having a wire exit pulley 52 and rotatably mounted on a mounting plate 54. The block 44 also has wire guide surfaces that function primarily to prevent the wire 20 from engaging parts of the stator core 22 outside the pair of core slots 24 into which a stator coil is to be wound.

An inner winding form assembly 56 is mounted on the front face of the mounting plate 54 and has wire guiding surfaces along which the wire 20 slides and is guided into the proper set of core slots 24 to form a coil therein as the flier 50 rotates to draw the wire 20 from a source (not shown) of wire under tension. The entire flier mechanism including the inner winding form assembly 56 is movable axially away from the position shown in the drawings in order to permit the placement of unwound stator cores on the mandrel 38 and the removal of wound cores therefrom. Such placement and removal may be done manually or could be done by an automatic load/unload mechanism (not shown).

Figure 5:
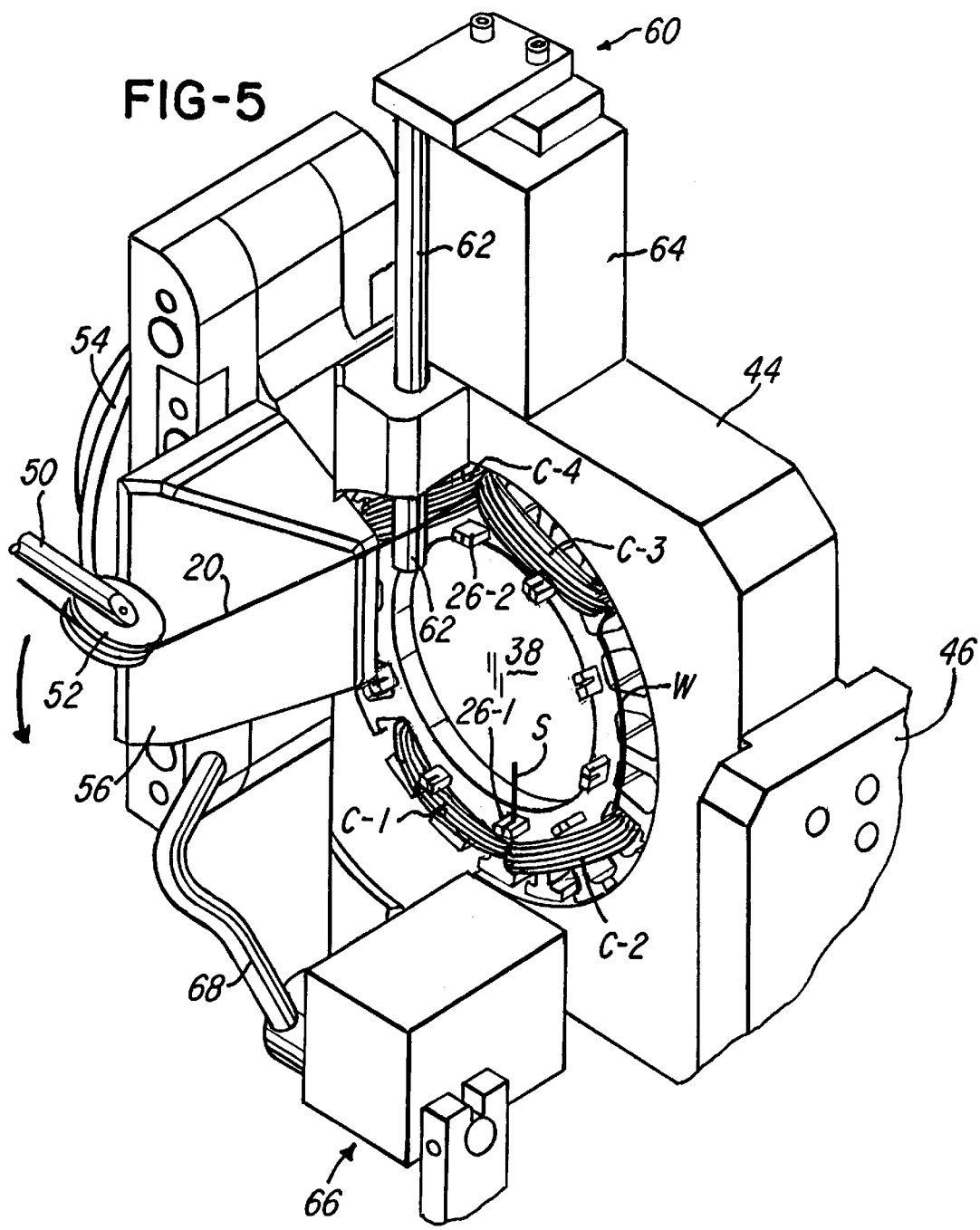
Figure 6:
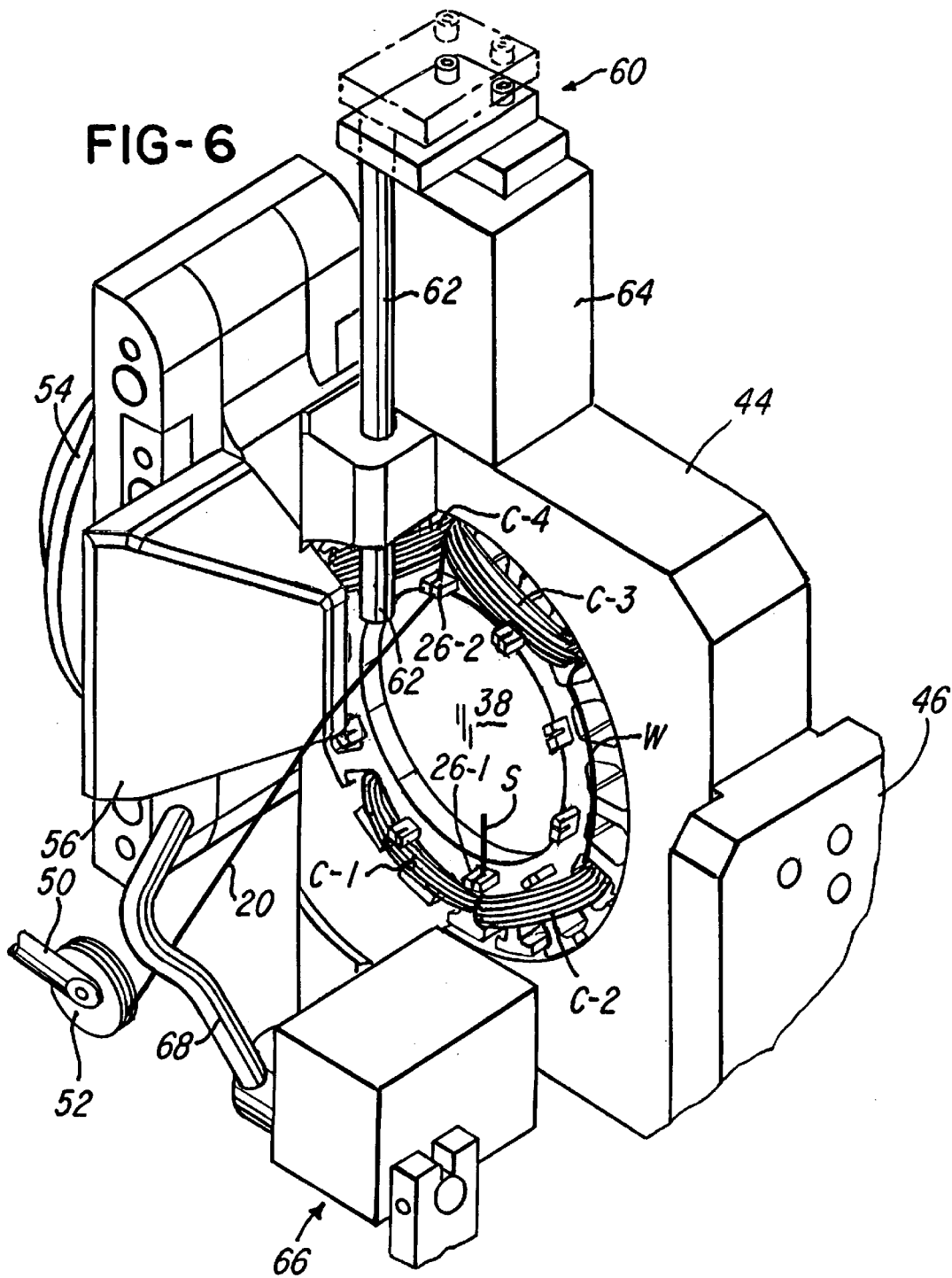
Figure 7:
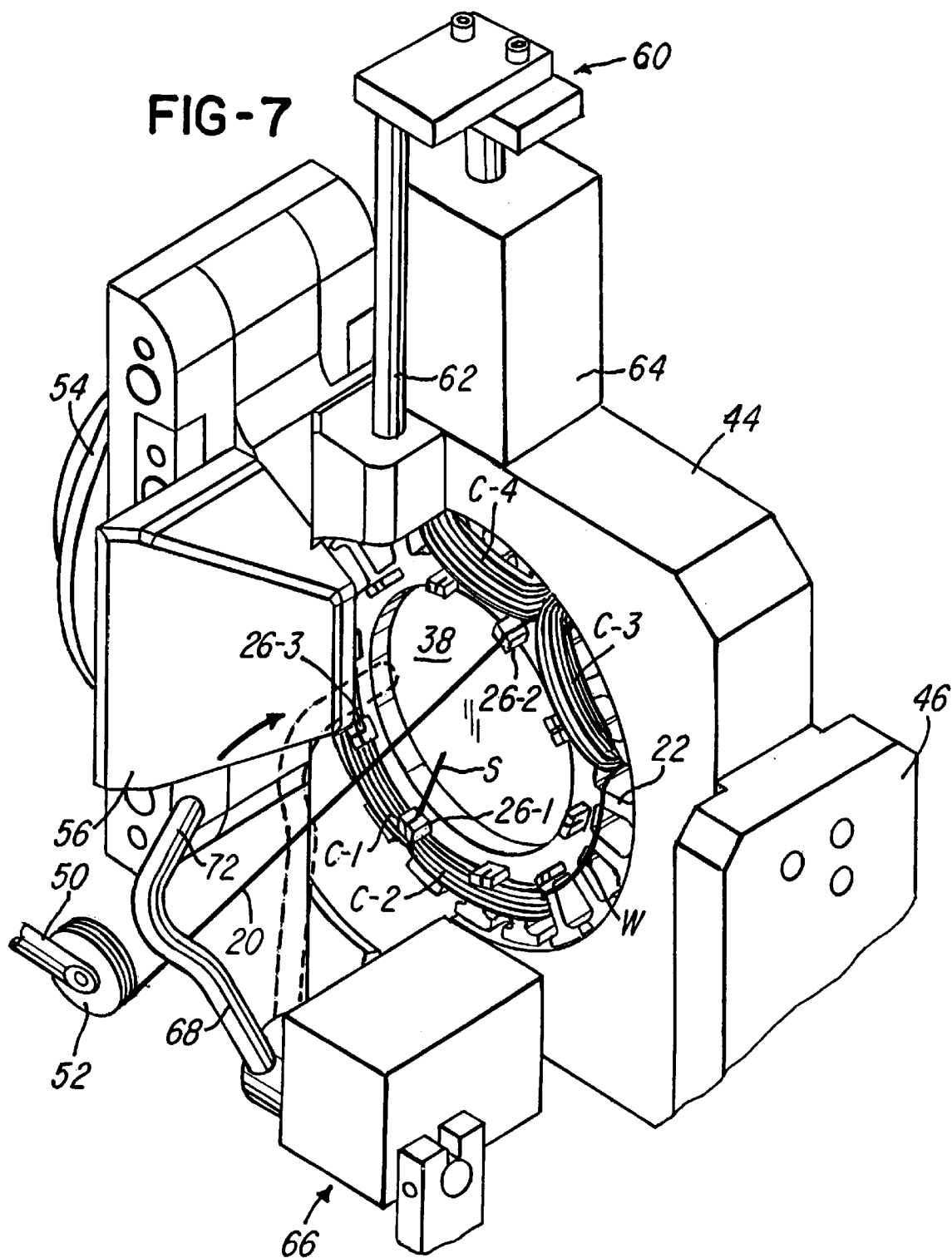

With reference to FIGS. 5, 6 and 7, in accordance with this invention, a first lead wire guide assembly, generally designated 60, is provided that comprises a vertically-movable lead guide member or pin 62 guided in a bearing mounted on the winding form block 44 and vertically driven by a first air actuator 64 between a lower, extended or operative position, shown in FIG. 5, to a retracted, upper, out-of-the-way position shown in FIG. 7. In its lowered, operative position, the pin 62 extends parallel to the front face of the stator core 22 and in front of a section of the core 22 and its bore 25. As will become apparent, the pin 62 is thereby effective, in its operative position, to be engaged by the wire 20 during certain intervals of operation of the stator winding machine 30.

Here it should be noted that relative terms such as upper and lower, vertical and horizontal, and clockwise and counterclockwise, as used herein, are used in a relative sense and not in an absolute sense.

Figure 8:
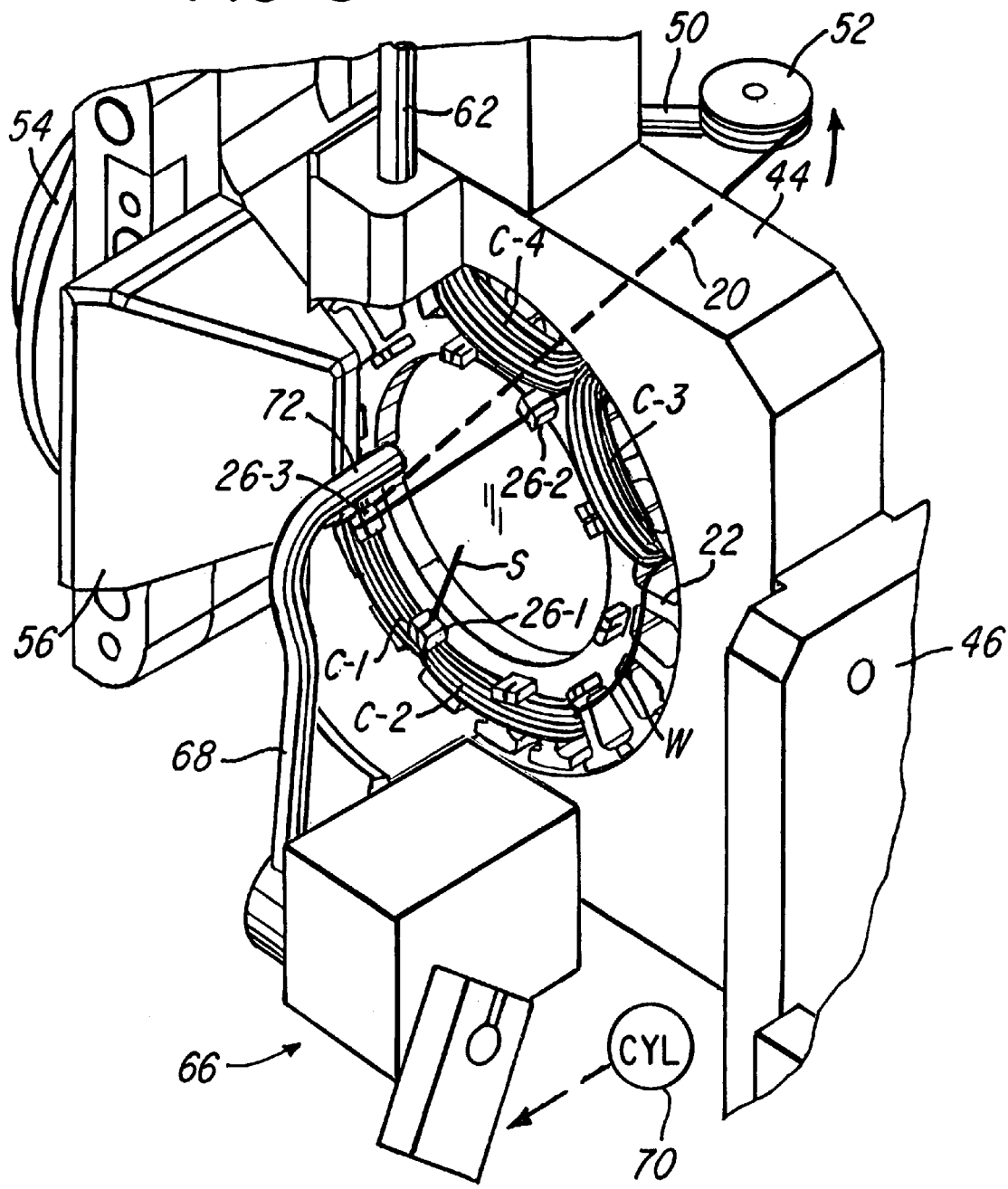

With reference to FIGS. 1, 7 and 8, in accordance with this invention, a second lead wire guide assembly, generally designated 66, is provided that comprises a pivotally-mounted second lead guide member or hook 68 pivotally mounted for rotation about a horizontal axis and driven by a second air actuator 70 between an inner, extended or operative position, shown in FIG. 8, to an outer, retracted, out-of-the-way position shown in FIG. 1. In its inner, operative position, the free end leg 72 of the hook 68 extends perpendicular to the front face of the stator core 22. As will become apparent, the hook 68 is thereby effective, in its operative position, to be engaged by the wire 20 during certain intervals of operation of the stator winding machine 30.

The operation of the stator winding machine 30 is illustrated beginning with FIG. 1 and continuing in sequence, through FIG. 8. FIG. 1 shows the stator core 22 after a start wire segment S has been inserted into the wire-receiving slot 28 of a first one of the terminal members, designated 26-1, and the first two coils of wire, designated C-1 and C-2, respectively, have been wound. The method by which the start wire segment S is inserted into the terminal member 26-1 is unimportant to an understanding of this invention. Briefly, it can be inserted following steps similar to those described below with reference to other coil start wires, but beginning with the wire 20 from the flier 50 held in a clamp (not shown). After the start wire segment S is inserted into the terminal member 26-1, the first coil C-1 may be wound with the flier 50 rotating in a top coming direction and the second coil C-2 may be wound with the flier 50 rotating in a top going direction. Of course, the stator core 22 must be indexed as required to accomplish the foregoing steps of inserting the start wire segment S and winding the first two coils.

After the second coil C-2 has been wound as shown in FIG. 1, the lead guide pin 62, which has been retracted as shown by full lines in FIG. 1, is extended downwardly into its operative position, as shown by phantom lines in FIG. 1.

Figure 4:
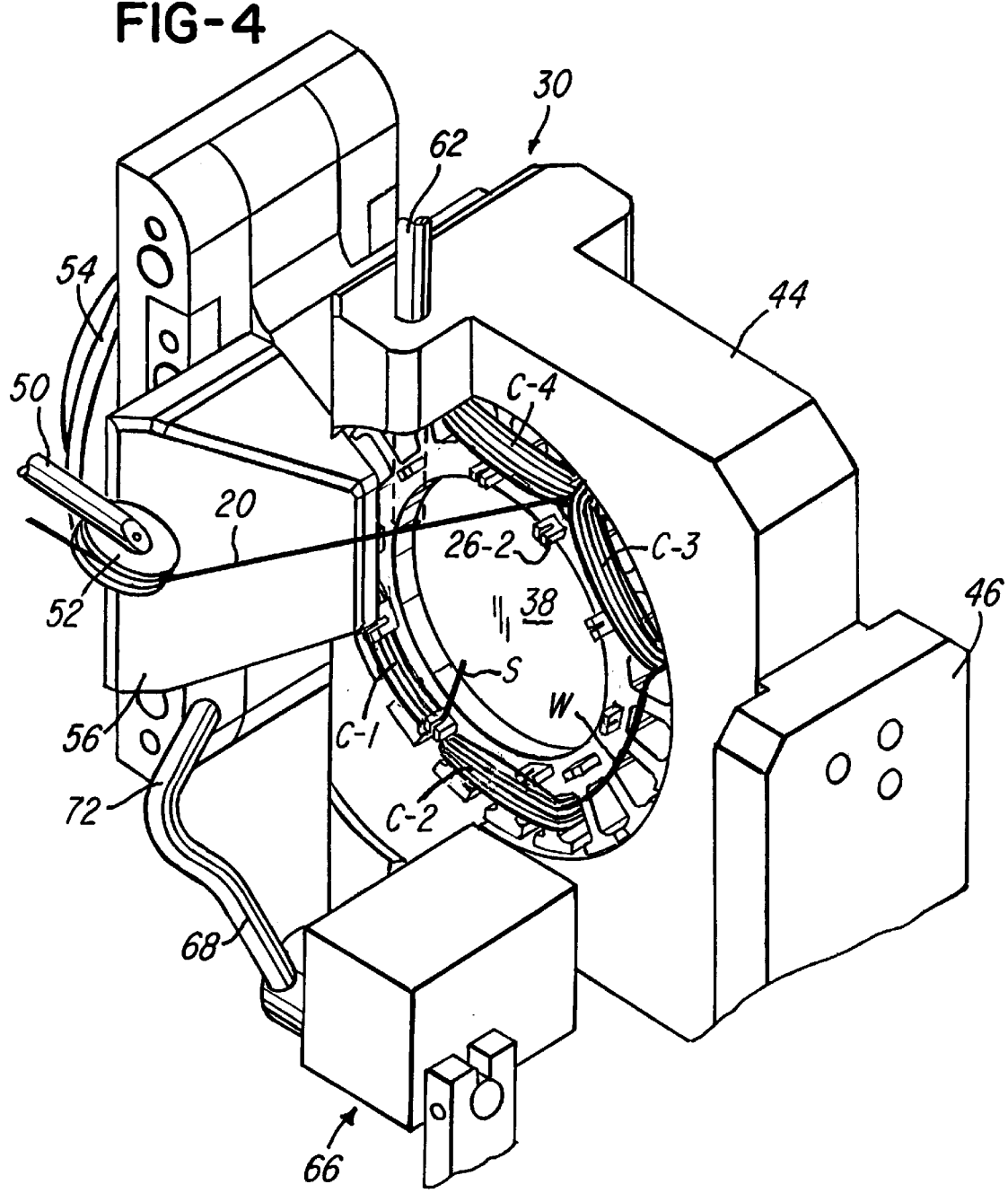

The stator core 22 is then rotated in a clockwise direction as shown in FIG. 2 in preparation for the winding of a second pair of coils C-3 and C-4 (See FIGS. 3 and 4, for example). The angle through which the stator core 22 has been rotated is substantial and there is a possibility that the wire segment W between the finish of coil C-2 and the flier pulley 52 could extend over parts of the fixed winding form assembly 42 when the flier 50 is rotated to wind the third coil C-3, which in this case is done by rotation of the flier 50 in a top going direction, as indicated by the arrow 74 in FIG. 2. This possibility is avoided in this case by confining the wire segment W between the lead guide pin 62 and the front face of the stator core 22 until after the winding of the third coil C-3 has commenced.

With reference to FIG. 3, the lead guide pin 62 is retracted at some time after the winding of the third coil C-3 and the completion of the winding of the fourth coil C-4. The fourth coil C-4 is wound with the flier 50 rotating in a top coming direction and the flier 50 stops at approximately the 9:00 o'clock position. In the particular stator configuration illustrated in FIG. 3, the fourth coil C-4 is the last of the first phase coils to be wound and the finish wire extending from the fourth coil C-4 is then inserted into a terminal member 26-2. This is accomplished first by rotating the stator core 22 in a clockwise direction through an angle sufficient that the segment of the wire 20 leading from the finish of the fourth coil to the flier pulley 52 is past, i.e., to the right of the path of movement of the lead guide pin 62, as shown in FIG. 4. The lead guide pin 62 is then extended downwardly into its operative position after which the stator core 22 is reversely rotated through an angle sufficient to cause the finish wire from the fourth coil C-4 to engage the right side of the lead guide pin 62 as shown in FIG. 5. Here it will be observed that the wire segment engaging the side of the lead guide pin 62 is generally aligned with the terminal member 26-2 so that, upon rotation of the flier 50 in a counterclockwise direction through several degrees, the finish wire from coil C-4 will enter the wire-receiving slot 28 in the terminal member 26-2. This is the position illustrated in FIG. 6. In this position, the flier 50 is temporarily at rest and the lead guide pin 62, which has been down in its operative position, is now retracted.

With reference to FIGS. 7 and 8, the lead guide pin 62 was last retracted in order not to interfere with the wire segment leading from terminal member 26-2 and the flier 50 when the stator core 22 is rotated in clockwise direction in order to position a pair of core slots 24 in position to receive the first coil (not shown) of the next phase winding, which is the position shown in FIG. 7. After such rotation of the stator core 22, the hook 68 is pivoted to its extended, operative position, by operation of the second actuator 70 as shown in FIG. 8. The position of the free end leg 72 of the hook 68, in its operative position, is in the path of the wire segment leading from the terminal member 26-2 to the flier pulley 52 so that, as shown in FIG. 8, when the flier 50 subsequently rotates in a top coming direction to start winding the first coil of the second phase, the wire segment extending from the terminal member 26-2 to the flier pulley 52 is guided into the wire-receiving slot 28 of the terminal member designated 26-3 in FIGS. 7 and 8.

The winding of the coils and the insertion of the lead wires for each phase into the terminal members can follow the same patterns and sequences described above until the stator is fully wound.

This invention is disclosed with reference to a stator core having a particular construction using a specific winding pattern, but it will be apparent to those familiar with the art that this invention may be used to wind stators having various different core constructions, terminal members, and winding patterns. Although the presently preferred embodiments of this invention have been described, it will be understood that within the purview of the invention various changes may be made within the scope of the following claims.

Having thus described our invention, we claim:

1. An apparatus for manufacturing an electric motor stator comprising a stator core having a longitudinal axis, an end face, and a plurality of radially-extending, outwardly open slots, and a plurality of terminal members mounted on said end face, each of said terminal members having a wire-receiving cavity, said apparatus comprising:

a stator rotator mechanism adapted to support and rotate a stator core about its longitudinal axis;

a rotatable flier mechanism that draws wire from a source of wire under tension;

wire-guide tooling that, upon rotation of said flier mechanism, guides wire exiting said flier mechanism into selected pairs of slots in said stator core aligned with guide surfaces on said wire-guide tooling to thereby form coils in said slots; and a lead wire guide assembly comprising:

a wire-guiding member movable between a retracted, out-of-the-way position remote from the end face of said stator core and an operative position adjacent the end face of said stator core, said wire-guiding member having a wire-guiding surface generally aligned with the cavity of a terminal member supported on the end face of said stator core when said wire-guiding member is in said operative position, said wire-guiding surface being in the path of a segment of wire extending from said flier mechanism, subsequent rotation of said flier mechanism causing said segment of wire to move along said wire-guiding surface and into the cavity of said terminal member, and an actuator drivingly connected to said wire-guiding member for moving said wire-guiding member between its retracted position and its operative position.

2. The stator winding apparatus of claim 1 wherein said lead wire guide assembly is a first lead wire guide assembly, and further comprising a second lead wire guide assembly comprising:

a second wire-guiding member movable between a retracted, out-of-the-way position remote from the end face of said stator core and an operative position adjacent the end face of said stator core, said second wire-guiding member having a wire-guiding surface generally aligned with the cavity of a terminal member supported on the end face of said stator core when said second wire-guiding member is in said operative position, said second wire-guiding surface being in the path of a segment of wire extending from said flier mechanism, subsequent rotation of said flier mechanism causing said segment of wire to move along said second wire-guiding surface and into the cavity of said terminal member, and a second actuator drivingly connected to said second wire-guiding member for moving said second wire-guiding member between its retracted position and its operative position.

3. The stator winding apparatus of claim 2 wherein said first wire-guiding member is linearly movable between its retracted position and its operative position and wherein said second wire-guiding member is pivotally movable between its retracted position and its operative position.

4. The stator winding apparatus of claim 1 wherein said wire-guide tooling comprises a generally C-shaped fixed wire guide that extends partially around an outer circumference of said stator core, and wherein said wire-guiding member is movably mounted on said fixed wire guide.

5. The stator winding apparatus of claim 1 wherein said wire-guiding member comprises a wire-guiding finger.

6. The stator winding apparatus of claim 1 wherein said wire-guiding member moves linearly from its retracted position to its operative position.

7. The stator winding apparatus of claim 6 wherein said wire-guiding member is guided for linear movement between its retracted position and its operative position by bearing surfaces of said wire-guide tooling.

8. The stator winding apparatus of claim 7 wherein said actuator is mounted on said wire-guide tooling.

9. The stator winding apparatus of claim 7 wherein said wire-guiding member moves generally parallel to the end face of said stator core when moved between its retracted position and its operative position.

10. The stator winding apparatus of claim 1 wherein said wire-guiding member moves pivotally from its retracted position to its operative position.

11. The stator winding apparatus of claim 10 wherein said wire-guiding member is pivotally mounted on said wire-guide tooling.

12. A method for manufacturing an electric motor stator comprising a stator core having a longitudinal axis, an end face, and a plurality of radially-extending, outwardly open slots, and a plurality of terminal members mounted on said end face, each of said terminal members having a wire-receiving cavity, said method comprising:

winding coils of wire into selected pairs of slots in said stator core using a rotating flier mechanism;

stopping rotation of said flier mechanism after the winding of one of said coils with a segment of wire extending from said one of said coils to said flier mechanism;

moving a wire-guiding member into an operative position adjacent the end face of said stator core with a wire-guiding surface on said wire-guiding member generally aligned with the cavity of a terminal member on the end face of said stator core, at least a portion of said wire-guiding member being located between said segment of wire and the end face of said stator core;

rotating said flier mechanism so that said segment of wire moves along said wire-guiding surface and into the cavity of said terminal member; and thereafter, retracting said wire-guiding member to an out-of-the-way position.

13. The method of claim 12 further comprising the step of:

before said last-mentioned step of rotating said flier mechanism, rotatably indexing said stator core so that said segment of wire engages said wire-guiding member.

14. The method of claim 12 wherein said step of moving said wire-guiding member comprises moving said wire-guiding member linearly.

15. The method of claim 12 wherein said step of moving said wire-guiding member comprises pivoting said wire-guiding member.

16. The method of claim 12 wherein said winding step comprises the steps of:

rotatably indexing said stator core about its longitudinal axis between the winding of individual coils; and after rotatably indexing the stator following the winding one of said coils but before the winding of a successive coil, moving a wire-retaining member into an operative position confronting the end face of said stator core and spaced therefrom to confine a segment of wire extending from said one coil to said flier mechanism between said wire-retaining member and the end face of said stator core.

17. The method of claim 16 wherein said wire-retaining member comprises said wire-guiding member.

18. An apparatus for manufacturing an electric motor stator comprising a stator core having a longitudinal axis, an end face, and a plurality of radially-extending, outwardly open slots, and a plurality of terminal members mounted on said end face, each of said terminal members having a wire-receiving cavity, said apparatus comprising:

a stator rotator mechanism adapted to support and rotate a stator core about its longitudinal axis;

a rotatable flier mechanism that draws wire from a source of wire under tension;

wire-guide tooling that, upon rotation of said flier mechanism, guides wire exiting said flier mechanism into selected pairs of slots in said stator core aligned with guide surfaces on said wire-guide tooling to thereby form coils in said slots; and a lead wire retainer assembly comprising:
      a wire-retaining member movable between a retracted, out-of-the-way position remote from the end face of said stator core and an operative position confronting the end face of said stator core and spaced therefrom, said wire-retaining member, when in its operative position, confining a segment of wire extending from a wound coil on said stator core to said flier mechanism between said wire-retaining member and the end face of said stator core, and
      an actuator drivingly connected to said wire-retaining member for moving said wire-retaining member between its retracted position and its operative position.

19. A method for manufacturing an electric motor stator comprising a stator core having a longitudinal axis, an end face, and a plurality of radially-extending, outwardly open slots, and a plurality of terminal members mounted on said end face, each of said terminal members having a wire-receiving cavity, said method comprising:

using a rotating flier mechanism, winding a first coil of wire into a pair of slots in said stator core aligned with guide surfaces of wire-guide tooling that guides wire exiting said flier mechanism into said pair of slots;

with a segment of wire extending from said first coil to said flier mechanism, rotatably indexing said stator core to align another pair of slots in said stator core with the guide surfaces of said wire-guide tooling;

thereafter, moving a wire-retaining member into an operative position confronting the end face of said stator core to confine the segment of wire extending from said first coil to said flier mechanism between said wire-retaining member and the end face of said stator core;

thereafter, winding a second coil into said another pair of slots in said stator core; and after commencing the winding of said second coil, retracting said wire-retaining member to an out-of-the-way position.

* * * * *